Aug. 19, 1952     F. L. PARENTI     2,607,338
JUICE CATCHER FOR COOKING UTENSILS
Filed April 4, 1950
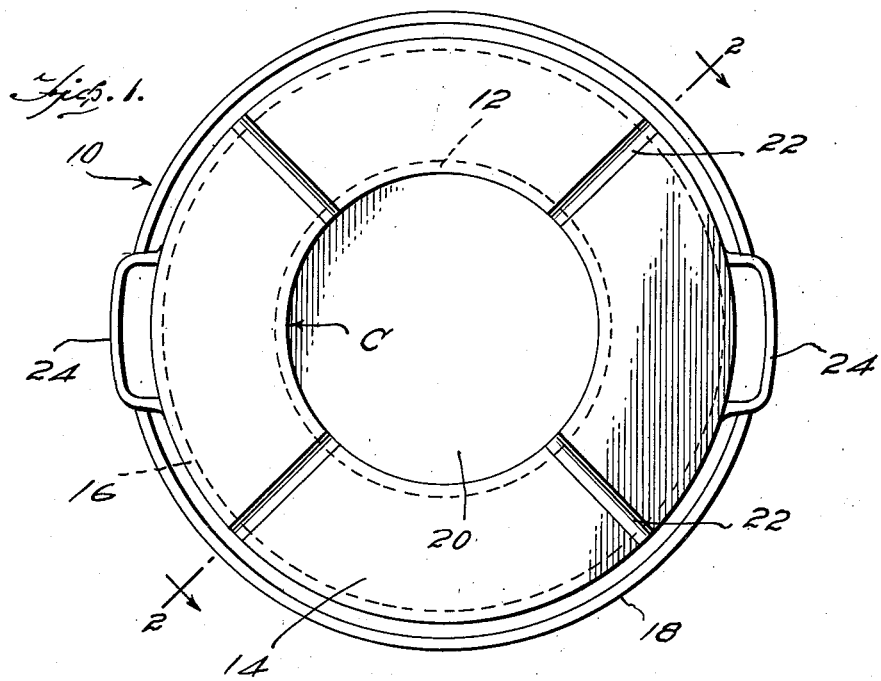
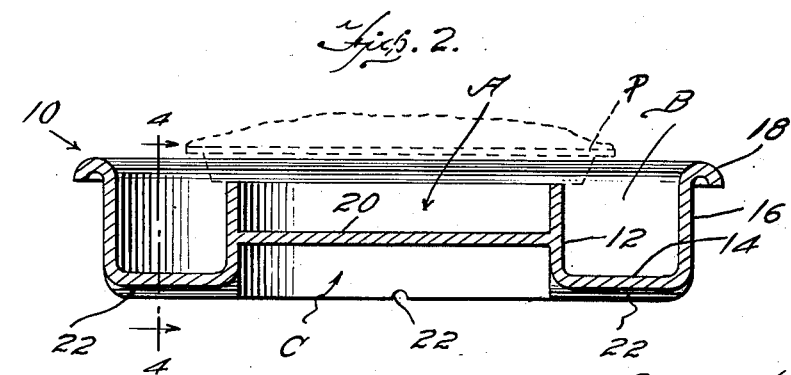
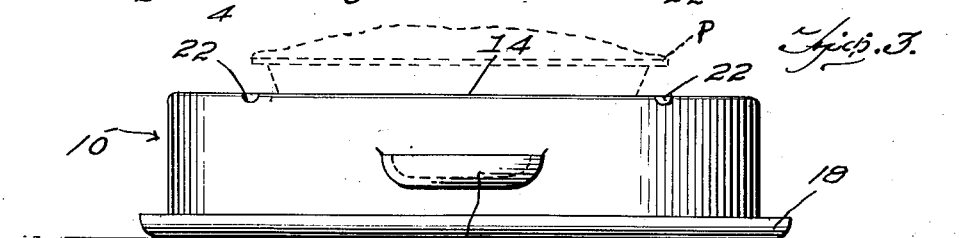
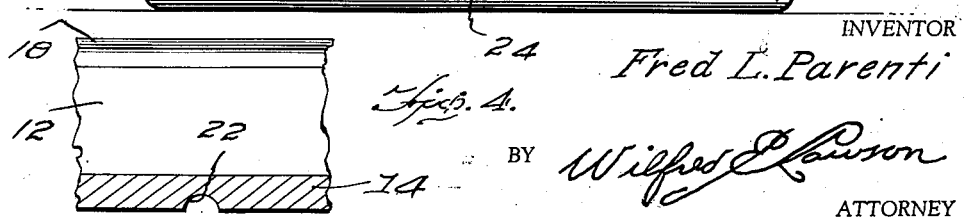
INVENTOR
Fred L. Parenti
BY Wilfred E. Lawson
ATTORNEY Patented Aug. 19, 1952

2,607,338

UNITED STATES PATENT OFFICE 2,607,338

JUICE CATCHER FOR COOKING UTENSILS

Fred L. Parenti, Culver City, Calif.

Application April 4, 1950, Serial No. 153,819

1 Claim. (Cl. 126—385)

This invention relates to a juice catcher for a cooking utensil and has relation more particularly to a device especially more advantageous for use in baking.

It is an object of the invention to provide a device which may be used to advantage in baking of pies and like products wherein means are provided for catching juices which may be expelled from the pie fillers or the like.

Another object of the invention is to provide a device that may be employed to advantage in the baking of coffee rings, layer cakes, and in the making of fruit gelatin rings, puddings and like desserts A still further object of the invention is to provide a device wherein means are provided to allow for air circulation across the bottom face of the bottom wall thereof to facilitate cooling of the contents thereof or to serve as a cooler for pans or the like placed thereon.

The invention consists in the details of construction and in the combination and arrangement of the several parts of my improved cooking utensil whereby certain advantages are attained, as will be hereinafter more fully set forth.

In order that my invention may be better understood, I will now proceed to describe the same with reference to the accompanying drawings, wherein:

Figure 1 is a view in top plan of a device constructed in accordance with the present invention;

Figure 2 is a sectional view taken substantially on the line 2—2 of Figure 1;

Figure 3 is a view in side elevation of the device shown in inverted position as used for cooling a pie or the like;

Figure 4 is a detail sectional view in an enlarged scale taken on the line 4—4 of Figure 2.

Referring to the drawing in detail, the device comprises a cylindrical body generally designated 10, which is formed of any suitable material that will withstand heating to temperatures suitable for baking and constitutes a stand to support a baking pan or the like P on one or the other of its sides, substantially as shown in Figures 2 and 3. The stand is preferably of a one-piece (integral) metal construction and comprises an outer annular portion of U-shape cross-section and an inner portion in the form of a horizontally disposed flat wall or web 20 which divides the center of the annular portion into a pair of oppositely disposed chambers A and C. The annular portion has a flat wall 14 connecting its inner and outer walls 12 and 16, and its inner wall 12 is of a lesser height than that of its outer wall 16, the latter having its free edge outwardly rolled to provide a supporting flange 18, when the stand is used in the position as shown in Figure 3. Formed in the outer side of the flat wall or web 14, of the outer annular portion, are radial grooves 22 which open at opposite ends respectively to atmosphere and into the chamber C to form vents through which air may have access to the chamber C when it is covered.

In order to facilitate the handling of the device, the outer wall 16, of the annular portion is provided at diametrically opposite points intermediate the flat wall 14 and rolled edge 18 with handles 24.

In use when the device is to be used to collect the overflow of juices as in baking a pie, as shown in Figure 2, the pie pan or dish P containing the pie, is placed on the stand in such a position as to cover the chamber A with the edge of the pie pan or dish overhanging the annular channel or chamber B. The device together with the pie and pie pan or dish is then placed in an oven and the pie baked in a conventional manner. Obviously as the juices from the pie filling expand through the heat of the oven and overflow the pie dish, they will be caught in the annular chamber B, thus avoiding contact with the oven bottom and the burning thereon. Through the medium of the grooves or vents 22 it is obvious that the heated air in the oven will have access to the chamber C so as to assure proper circulation therethrough and correct baking of the bottom pie crust. When it is desired to use the device as a rack or stand for cooling hot dishes and protecting counter or table tops from injury, the device is placed on the supporting surface in the position shown in Figure 3, with the vessel to be cooled resting on the flat wall 14 and closing chamber C. In this position it is evident that air will have access to the bottom of the vessel and to the interior of chamber C through the grooves or vents 22.

From the foregoing description it is thought to be obvious that a juice catcher for a cooking utensil constructed in accordance with my invention is particularly well adapted for use by reason of the convenience and facility with which it may be assembled and used.

I claim:

In a cooking stand, a cylindrical body comprising an outer annular portion of U-form in cross-section to provide outer and inner side walls and a flat bottom wall, an inner portion in the form of a horizontally disposed flat web dividing the center of the annular portion to provide a pair of oppositely disposed chambers, the inner side wall of said annular portion having a height less than that of the outer side wall thereof, and a supporting flange outwardly rolled from the free edge of said outer side wall, said flat bottom wall having a plurality of radially extending grooves in its outer surface constituting air ducts connecting the adjacent of said chambers to atmosphere, when the stand is used in an inverted position.

FRED L. PARENTI.

REFERENCES CITED

The following references are of record in the file of this patent:

UNITED STATES PATENTS

| Number | Name | Date |
|---|---|---|
| 897,928 | Reiter | Sept. 8, 1908 |
| 1,063,526 | Fuller | June 3, 1913 |
| 1,158,135 | Lake | Oct. 26, 1915 |
| 1,635,286 | McClure | July 12, 1927 |